May 11, 1937.  S. D. BUTTERWORTH  2,079,930
CAR LOADING DEVICE
Filed Dec. 12, 1932   2 Sheets-Sheet 1
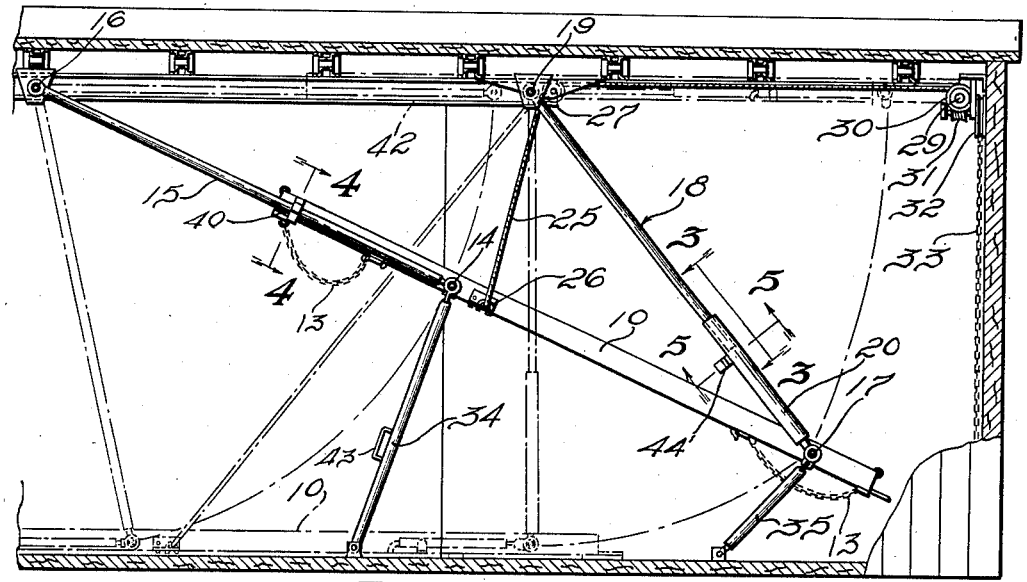
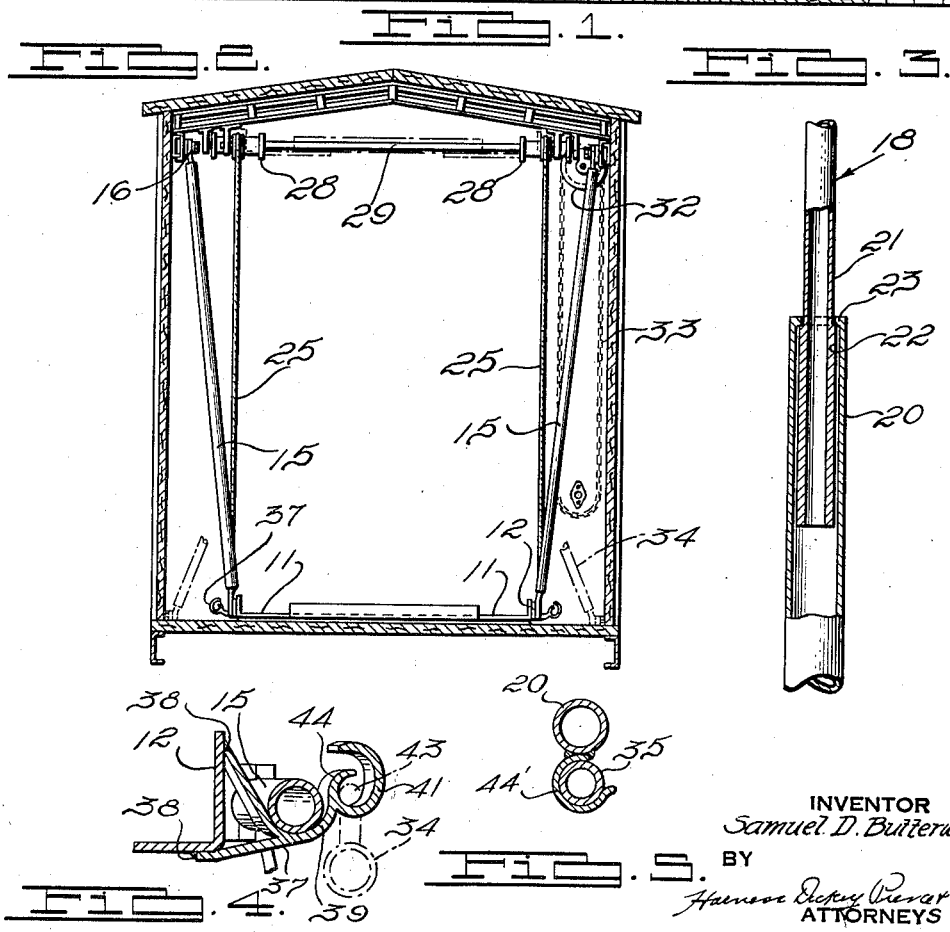
INVENTOR
Samuel D. Butterworth.
BY
ATTORNEYS May 11, 1937.   S. D. BUTTERWORTH   2,079,930
CAR LOADING DEVICE
Filed Dec. 12, 1932   2 Sheets-Sheet 2
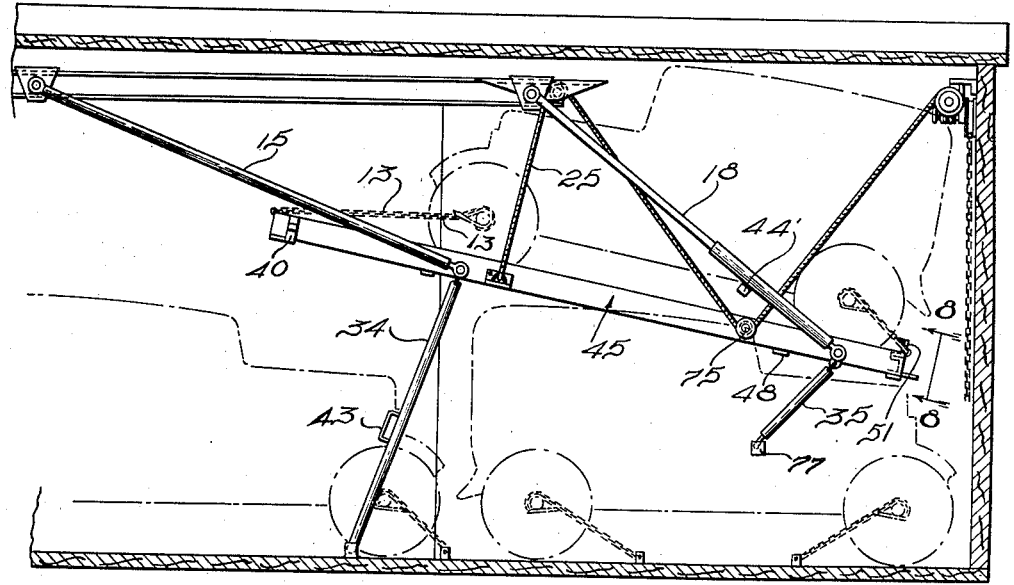
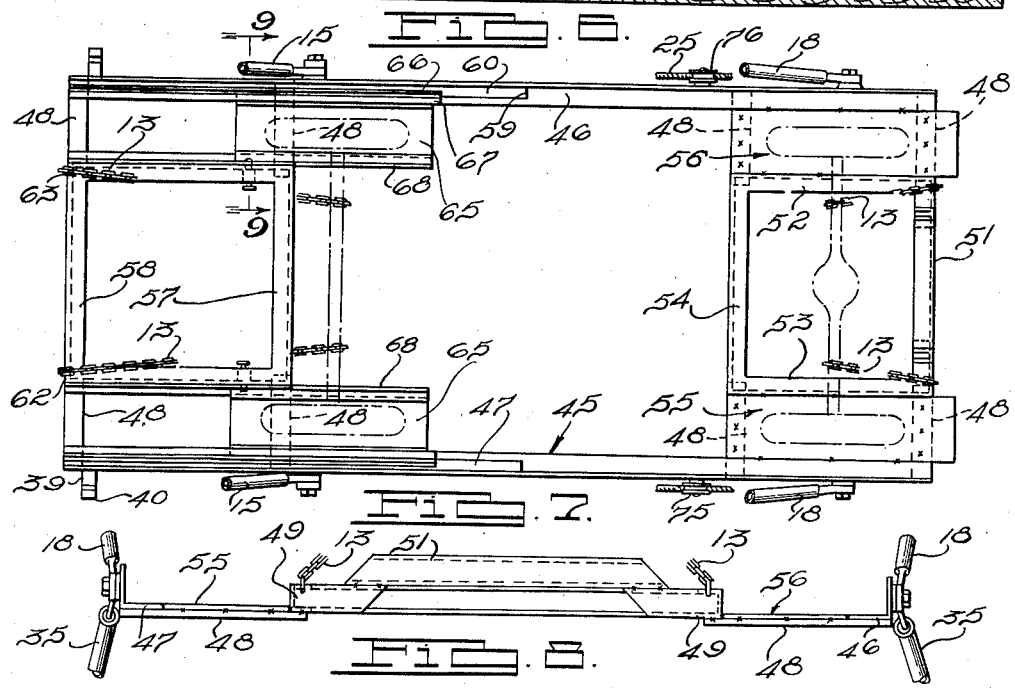
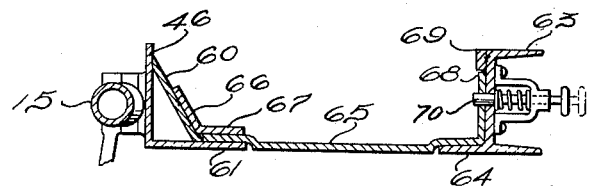
INVENTOR
Samuel D. Butterworth.
BY
Harness, Dickey, Pierce & Hann.
ATTORNEYS.

Patented May 11, 1937

2,079,930

UNITED STATES PATENT OFFICE 2,079,930

CAR LOADING DEVICE

Samuel D. Butterworth, Detroit, Mich., assignor, by mesne assignments, of ninety-nine per cent to The Worth Company, a corporation of Michigan Application December 12, 1932, Serial No. 646,830

52 Claims. (Cl. 105—368)

The invention relates to car loading devices and it has particular relation to a mechanism for disposing an automobile in a semi-decking position for transportation purposes.

One object of the invention is to provide a mechanism, including a supporting frame for an automobile or the like, in which the frame may automatically be moved from a position adjacent to the floor, into a semi-decking position.

Another object of the invention is to provide a mechanism for positioning an automobile in inclined relation to the floor of a freight car, which can automatically be moved into substantially a horizontal position adjacent the roof of the car.

Another object of the invention is to provide a semi-decking mechanism, which initially may be disposed on the floor of the freight car to receive an automobile, and then automatically moved into a semi-decking position.

Another object of the invention is to provide a semi-decking mechanism which may automatically be moved longitudinally of the car and into the semi-decking position, and then automatically located in a substantially horizontal plane adjacent the roof of the car where it will require a minimum of space when the car is to be used for other purposes.

Another object of the invention is to provide a method of and apparatus for loading automobiles in freight cars or the like, which enables loading smaller automobiles in a more compact relation and in a rapid and efficient manner.

Another object of the invention is to provide an improved loading frame adaptable for automobiles of different wheel base lengths, while still permitting maximum space for storing an automobile beneath the frame.

Other objects of the invention will become apparent from the following specification, and the claims hereinafter set forth.

For a better understanding of the invention reference may be had to the accompanying drawings forming a part of the specification, wherein:

Figure 1 is a fragmentary longitudinal cross-sectional view of a freight car illustrating a car loading mechanism constructed according to one form of the invention.

Fig. 2 is a transverse cross-sectional view of a freight car illustrating the car loading mechanism in its lowermost position with the supporting frame resting on the floor.

Fig. 3 is a cross-sectional view on a larger scale taken substantially along the line 3—3 of Fig. 1.

Fig. 4 is a cross-sectional view on a larger scale taken substantially along the line 4—4 of Fig. 1.

Fig. 5 is a cross-sectional view on a larger scale taken substantially along line 5—5 of Fig. 1.

Fig. 6 is a view similar to Fig. 1, but illustrating the manner in which a five car load may be effected.

Fig. 7 is a plan view of an improved frame employed in the arrangement shown by Fig. 6.

Fig. 8 is an end view, on a larger scale, of the frame as seen along line 8—8 of Fig. 6.

Fig. 9 is a cross-sectional view on a larger scale, taken substantially along line 9—9 of Fig. 7.

Referring to Figs. 1 and 2, a frame 10 of rectangular construction is illustrated, and, as shown particularly by Fig. 2, the frame at opposite sides has channel ways 11 for receiving the wheels of an automobile when the latter is rolled upon the frame with the latter resting on the floor as shown in broken lines in Fig. 1. These channels are located only at the corners of the frame and are short in length to so leave the frame open between the front and rear pairs of channels that an automobile on the floor may be rolled under the frame when it is in its semi-decking position, with a body portion of said automobile projecting up through the intermediate open portion of the frame. At each side of the frame, elongated irons 12 may connect the outer sides of the front and rear channels, so that the opening centrally of the frame is wide enough to allow the automobile body to project between such irons. While the decked automobile has not been illustrated, it will be understood that it is secured to the frame when positioned thereon with the wheels in the channel ways, by means of suitable fastening means such as chains 13 secured to the opposite ends of the frame and adapted to be secured to opposite ends of each of the axles on the automobile.

The forward end of the frame, is pivotally connected, as indicated at 14, to a pair of rods 15 disposed at opposite sides of the frame and these rods extend upwardly and have their upper ends pivotally connected to metal parts of the car frame as indicated at 16. The rear portion of the frame is pivotally connected at opposite sides as indicated at 17 to another pair of oppositely disposed rods 18 which in turn have their upper ends pivoted as indicated at 19, also to metal parts of the car frame. As shown by Fig. 1 in broken lines, when the frame is on the floor the front pair of rods 15 are inclined forwardly to a nearly vertical plane, while the rear rods 18 are disposed substantially in a vertical plane.

Each of the rods 18 is of telescopic character as shown by Fig. 3 and includes a large tubular portion 20 which receives a smaller portion 21 having its inner and lower end enlarged as indicated at 22 to provide a shoulder for engaging an inwardly turned flange 23 formed at the upper end of the tubular portion 20.

For raising the frame and causing the rods 15 and 18 to pivot about their upper pivotal ends, cables 25 may be provided at each side of the frame and such cables are connected to opposite sides of the latter adjacent the pivots 14 as indicated at 26. The cables in turn extend upwardly and are trained over pulleys 27 supported by the roof of the car and then extend substantially parallel to the roof and adjacent thereto, to a point adjacent the end wall of the car where they are trained over drums 28 mounted on a rotary shaft 29. This shaft may have a worm wheel 30 on the end thereof which meshes with a worm 31 and the worm shaft may be provided with a sprocket wheel 32 about which a chain 33 is trained. This chain extends downwardly along the rear wall of the car to a point where it is convenient for manual operation. Thus by manipulating the chain, the frame may be raised from its position on the floor and, owing to the gear reduction, it may be raised with an automobile thereon by manual manipulation without excessive effort. Owing to the inclination of the forward rods 15 and the substantially vertical position of the rear rods 18, when the frame is moved and the rods pivot about their upper pivotal connections, the frame will assume a semi-decking position inclined to the vertical as shown in full lines in Fig. 1. When the frame is in this position with an automobile thereon, it is preferred to use under-supporting members 34 and 35 pivoted to each side of the frame, which may releasably be connected to the floor to thereby provide a very rigid mounting.

While the mechanism thus described is very efficient for moving an automobile to a semi-decking position and supporting it in place during transportation, and lowering the automobile, and again placing the frame on the floor so that the automobile can readily be rolled from the frame, it has been found very advantageous to dispose the mechanism adjacent the roof of the car when the car is to be used for other purposes so that the frame and associated parts will take up a minimum of space. For effecting an automatic positioning of the mechanism adjacent the roof and substantially parallel thereto, pick-up bars 37 are provided at the forward end of the frame and on opposite sides thereof, and such bars may be welded or otherwise suitably secured to the frame as indicated at 38. These bars at the outer sides of the frame have hook portions 39 so disposed that when the frame 10 is in its semi-decking position, the rods 15 respectively will be aligned with the hooks and normally disposed therein although it may be preferred that when the frame is in its semi-decking position with an automobile thereon particularly, the rods 15 do not actually engage the base portions of the hooks so as to cause a strain thereon. It will be appreciated that with the frame in its semi-decking position that the hooks 39 will prevent side sway of the frame relative to rods 15. However, when an automobile is not on the frame, and the latter is raised, substantially at the time it reaches its semi-decking position or slightly thereafter, the rods 15 will engage the hooks 37 and the base portions thereof, and then this engagement in conjunction with the pivots 14 will cause the frame and rods to act as a single element which will pivot about the upper pivotal points 16 upon further raising of the frame. Thus, upon continued raising of the frame past its semi-decking position, such frame and the rods 15 will move about the pivots 16 until finally they are substantially horizontal and adjacent the roof of the car. It will be appreciated that as the frame and rods 15 move upwardly past the semi-decking position, the rods 18 will not interfere with this movement owing to the telescopic character thereof and that such rods will then become shorter in effect, as the raising operation continues until finally as the frame reaches its upper and substantially horizontal position, the rods 18 likewise will be substantially horizontal and along the sides of the frame.

It will be appreciated that when the automobile has been removed from the frame on the floor, all that the operator needs to do is to manipulate the chain and thus raise the frame to its semi-decking position and then automatically the hooks 39 will pick up the rods 15 and cause the frame and rods to move as a single member upwardly to a position adjacent the roof and substantially parallel thereto as indicated at 42 and that during this operation the rods 18 will become shorter and finally be disposed along the sides of the frame and also in substantially horizontal positions. The reverse of this operation of course will occur when the chain is manipulated to lower the frame and it will be readily understood that the aforesaid movements will occur automatically upon manipulating the chain in one direction or the other as the case may be.

The bars 37 also have secondary hook portions 41 disposed outwardly of the hook portions 39, and the secondary hook portions are adapted to receive handle grips 43 welded, for example, to rods 34. It will be observed that the hook portion 41 also includes a locking lip 44 spaced from hook 41 to provide an entry for the handle 43, and that the free edges of the lip and hook are so disposed and overlap that once the handle is moved over hook 41 and then through the entry and below the lip 44, it is practically impossible for it to accidentally become removed through jolting of the freight car.

Resilient hooks 44' are also secured on the under sides of portions 20 of the rods 18, for receiving rods 35, and it will be noted that the entry of the hook is smaller than the rods to insure maintenance of the rods therein, once they are resiliently pressed through the entry of the hook.

When it is desired to move the frame adjacent to the roof, the rods 34 and 35 are swung about their pivots 14 and 17 and connected to the hooks as specified and then the entire mechanism will be in a horizontal plane when the chain is manipulated to raise it to its position adjacent the roof. When it is in this position, the car may be used for other purposes without interference from the loading mechanism.

In the mechanism shown by Figs. 6, 7, 8 and 9, a frame 45 generally similar to the frame 10 is provided comprising side angle irons 46 and 47 extending throughout the frame length. The rear ends of the angle irons are connected by welding, for example, to forward and rear short irons 48, and as best shown by Fig. 8, the rear irons 48 may be welded to short channel irons 49. These may be welded at their inner ends to an upwardly offset channel iron to provide an arch 51, the purpose of which will be later described. The channel irons 49 may be connected at their outer ends to channels 52 and 53, which may be connected at their opposite ends to a cross channel 54, in turn connected to the inner ends of the forward irons 48. At opposite rear corners of the frame short pans 55 and 56 are welded to the irons 48, and the pans in conjunction with the angle irons 46 and 47 and the channel irons 52 and 53 provide short channel ways for receiving one pair of vehicle wheels. The channel iron 54 may be offset upwardly also if desired.

The front end of the angle irons 46 and 47 similarly are connected to short irons 48, and these in turn are connected to a rectangular frame comprising connected channels 57, 58, 62 and 63. As shown by Figs. 7 and 9, each angle iron may be reinforced to a point indicated at 59 near its longitudinal center by a plate 60 which may be welded to opposite legs of the angle iron, and it will be noted that the plate is so positioned that the base leg of each angle iron has an exposed portion 61. Each of the channel irons 62 and 63 has an additional leg 64, and these legs, in conjunction with the portions 61, provide spaced supports for slidable pans or plates 65. For providing a guideway for the edges of the pans resting on portions 61, angle plates 66 may be welded to the plates 60 and have free legs 67 extending above and in spaced relation to such portions 61. The opposite edge portion of the pans may have flanges 68 extending along the webs of the channels 62 and 63 and to such webs ribs 69 may be welded for maintaining these edges of the pans in place. The pans are of about the same length as channels 62 and 63, and when in their forward positions, the rear edges of the pans substantially coincide with the rear ends of the channels. However, the pans may be slidably moved longitudinally and rearwardly of the frame, and positioned as shown by Fig. 7, and while the rear inner corners of the pans do not then rest on the channels, the support for other parts of the pans is sufficient to take care of loads thereon. For holding the pan in any adjusted position, spring pressed pins 70 may be employed which are adapted to project through openings in the webs of the channels 62 and 63 and selectively into longitudinally spaced openings in each flange 68.

In using the mechanism for loading larger automobiles, an automobile may be moved into the semi-decking position shown with the front pans in forward positions and then a second automobile may be rolled on the floor and under the frame and fastened to the floor. The central and open portion of the frame between the front and rear pans and the side irons 46 and 47 readily permits moving the second automobile under the frame with a portion of its body extending upwardly through the opening. This permits a ready mounting of four large automobiles in a car, one semi-decked at each end of the car, and two on the floor between the decked cars. However, if smaller automobiles are to be loaded, it is advantageous to load five in a car and this is accomplished as follows.

The pans 65 are disposed in further rearward positions, depending on the size of the automobile, as shown by Fig. 6, and with the frame on the floor, the smaller automobile is secured on the front and rear pans by chain devices 13 such as already have been described. Then the frame is elevated into its semi-decking position as shown by Fig. 1, and the front rods 34 are anchored to the floor. Now, the chain 33 can be manipulated to release the cables 25 and the loose cables between pulleys 27 and the drums 28 drop downward to positions adjacent the sides of the frame. For engaging such portions of the cables with the frame, pulleys 75 and 76 are mounted on the irons 46 and 47 adjacent the rear cross bar 48, and after the cables are disposed under the pulleys, the chain may be manipulated to raise the rear end of the frame about the pivots 14, during which the rods 18 telescope until the frame is disposed, as shown in Fig. 6. The fact that the front of the automobile is farther down the frame and on the front pans, of course permits this further elevation of the automobile without its striking the roof and the normally smaller height of the automobile body also permits further elevation. Then when the frame is in the position shown, the rear rods 35 may be connected to fastening devices 77 on the side walls of the car, instead of being fastened to the floor, as shown in Fig. 1, and the chain may be slackened to take the load off of the cables.

Then a second automobile may be rolled under the frame and because of the further raised position of the frame, and usually the smaller size of the automobile, the latter may be moved into the opening in the frame rearwardly of the front pans and substantially against the end wall of the car. The arched cross iron 49 naturally facilitates moving the radiator of the floor automobile to such position. This decking and positioning of small automobiles at each end of the car permits placing a fifth automobile in the center of the car. Removal of the decked automobile may be effected by slightly tensioning the cables by operation of the chain, and then disconnecting rods 35 from the walls of the car. Then the chain may be manipulated to lower the rear end of the frame until rods 18 again support this end of the frame. Then the cables may be removed from pulleys 75 and 76, and the chain manipulated to again slightly tension the cables following which rods 34 may be disconnected from the floor. Then of course the frame may be lowered to the floor by manipulation of the chain, and after the automobile is removed, raised to a position adjacent the roof.

It should be apparent that this mechanism may be used in the same manner as the mechanism shown by Fig. 1, and that the front pans may be adjustably positioned as desired. The rods 35 may be connected to the floor or to the side walls of the car depending on the type of loading, and the pulleys 75 and 76 may or may not be used, again depending on the type of loading. If larger automobiles are being loaded, and decked as shown in Fig. 1, movement of the front pans forwardly enlarges the central open space in the frame for the body portion of the floor automobile and also compensates for the increased wheel base of the decked automobile. When smaller automobiles are decked, movement of the front pans rearwardly compensates for the smaller wheel base, and additionally still leaves the opening in the frame large enough, particularly when the frame is inclined at a smaller angle, for receiving the body of the end floor automobile.

While the invention is particularly applicable to freight cars, it is evident that it is applicable in other instances, such as in motor conveyances and in stationary storage spaces or compartments. The terms "freight car", "box car", or "freight car or the like", as used in the claims, should not therefore be considered as limiting the invention to use in a freight car in view of such other applications of the invention as are and will become apparent.

Although more than one form of the invention has been illustrated and described in detail, it will be appreciated by those skilled in the art that various modifications may be made without departing from the scope of the appended claims.

I claim:

1. The combination with a freight car or the like, of a frame for supporting an object, means for holding the object on the frame, and means for raising the frame from a substantially horizontal position on the floor of the car including means for automatically directing it into a position inclined to the vertical with the entire frame spaced from the floor.

2. The combination with a freight car or the like, of a frame for supporting an object, means for holding the object on the frame, and means for automatically displacing the entire frame and object as a unit lonigtudinally of the car and into an inclined position.

3. The combination with a freight car or the like, of a frame for supporting an automobile, means for swingably connecting a part of the frame to the car so that the entire frame may move longitudinally of the car, and means independent of the automobile for automatically swinging the entire frame longitudinally of the car and into an inclined position.

4. The combination with a freight car or the like, of a frame adapted to support an automobile, rigid means pivotally connecting one end of the frame to an upper part of the car, means movably connecting the other end of the frame to an upper part of the car, and means cooperating with both of said means for moving the frame into an inclined position.

5. The combination with a freight car or the like, of a supporting frame, rigid means pivotally connected at its upper end to an upper part of the car and at its lower end to one end of the frame, means operating in conjunction with the frame for swinging the rigid means and moving the frame longitudinally of the car and tilting the frame into an inclined position and means locking the frame to the rigid means after the frame has reached a certain inclined position, to cause the frame to swing bodily about the pivot at the upper end of the rigid means upon continued swinging of the latter.

6. The combination with a freight car or the like, of a supporting frame, rigid means pivotally connected at its upper end to an upper part of the car, and at its lower end to one end of the frame, means for swinging the rigid means about its upper pivot and moving the frame longitudinally of the car and tilting the frame, means locking the frame to the rigid means after the frame has reached a certain inclined position, to cause the frame to swing bodily about the upper pivot of the rigid means upon continued swinging of the latter, means for raising the other end of the frame during such tilting operation, and means for rendering the last means ineffective when the rigid means and frame are locked and swing as a unit.

7. The method of manipulating an object supporting frame in a freight car or the like, which comprises moving the entire frame longitudinally of the car and simultaneously into an inclined position, and then raising the entire frame into a substantially horizontal position adjacent the roof of the car.

8. The method of manipulating an object supporting frame in a freight car or the like, which comprises swinging the entire frame from substantially a horizontal position adjacent the floor, longitudinally and simultaneously into an inclined position, and then swinging the frame nto a position adjacent to and substantially parallel to the roof of the car.

9. The method of loading an automobile in a freight car or the like, which comprises moving the entire automobile longitudinally of the freight car and simultaneously into an inclined position and then further raising the lower end of the automobile with respect to the higher end.

10. The method of loading an automobile in a freight car or the like, which comprises moving the entire automobile lonigtudinally of the car and simultaneously into an inclined position with the entire automobile elevated, and then raising the lower end of the automobile with respect to the higher end.

11. In combination, a substantially rectangular decking frame comprising side bars spaced sufficiently to receive a portion of an automobile body between them, means on the frame between the side bars, and at one end thereof for supporting one set of the automobile wheels thereon, and means between the other ends of the side bars and adjustable longitudinally thereof for supporting the other set of wheels.

12. In combination with a freight car, an automobile decking frame, pivotally suspended movable elements interposed between the car and frame for automatically directing the path of travel of the frame into semi-decking position, and means for raising the frame.

13. In combination with a freight car, an automobile decking frame, pivotally suspended movable elements interposed between the car and frame for automatically directing the path of travel of the frame into semi-decking position, means for raising the frame and separate means for holding the frame in elevated position.

14. In combination with a freight car, an automobile decking frame, pivotally suspended movable elements interposed between the car and frame for automatically directing the path of travel of the frame into semi-decking position, means for raising the frame, and brace members interposed between the decking frame and the freight car.

15. In combination, a freight car, a decking frame, pivotally suspended means for movably connecting the frame to the car, and means cooperating with the aforesaid means and frame for automatically moving the frame longitudinally of the car and raising the same into inclined decking position.

16. The combination with a freight car or the like, of a frame for supporting an automobile or the like, arm means pivotally connected at its upper end to an upper part of the car and at its lower end to one end of the frame, means for swinging the arm means about its upper end and moving the frame longitudinally of the car and tilting the frame, and means operatively locking the frame to the arm means after the frame has reached a certain position to cause the frame and arm means to swing as a unit about the upper pivot of the arm means upon continued swinging of the latter.

17. The combination with a freight car or the like, of a frame for supporting an automobile or the like, arm means pivotally connected at its upper end to an upper part of the car and at its lower end to one end of the frame, means for swinging the arm means about its upper end and moving the frame longitudinally of the car and tilting the frame, and means operatively locking the frame to the arm means after the frame has reached a position substantially in the plane of the arm means to cause the frame and arm means to swing as a unit about the upper pivot of the arm means upon continued swinging of the latter.

18. The combination with a freight car or the like, of a frame for supporting an automobile or the like, arm means pivotally connected at its upper end to an upper part of the car and at its lower end to one end of the frame, means for swinging the arm means about its pivot and moving the frame longitudinally of the car and tilting the frame, means for operatively locking the arm means to the frame after the latter has reached a predetermined position to cause the frame and arm means to swing as a unit, and means connected to the other end of the frame and to the car for supporting said end of the frame prior to interlocking the latter and arm means.

19. The combination with a freight car or the like, of a frame for supporting an automobile or the like, arm means pivotally connected at its upper end to an upper part of the car and at its lower end to one end of the frame, means for swinging the arm means about its pivot and moving the frame longitudinally of the car and tilting the frame, means for operatively locking the arm means to the frame after the latter has reached a predetermined position to cause the frame and arm means to swing as a unit, and means connected to the other end of the frame and to the car for supporting said end of the frame prior to interlocking of the latter and arm means, said means connected to the other end of the frame being collapsible in character and connected to an upper part of the car.

20. The combination with a freight car or the like, of a frame for supporting an automobile or the like, arm means pivotally connected at its upper end to an upper part of the car and at its lower end to one end of the frame, means for swinging the arm means about its pivot and moving the frame longitudinally of the car and tilting the frame, means for operatively locking the arm means to the frame after the latter has reached a predetermined position to cause the frame and arm means to swing as a unit, and means connected to the other end of the frame and to the car for supporting said end of the frame prior to interlocking of the latter and arm means, said means connected to the other end of the frame comprising a telescopic rod connected to an upper part of the car.

21. The combination with a freight car or the like, of a frame adapted to support an automobile or the like, arm means pivotally connected to the car and to one end of the frame, means pivotally connected to the other end of the frame and to the car, and means for raising the frame, whereby the arm means causes an arcuate movement of the end of the frame.

22. The combination with a freight car or the like, of a frame adapted to support an automobile or the like, arm means pivotally connected to the car and to one end of the frame, arm means pivotally connected to the other end of the frame and to the car, and means for raising the frame, said arm means being connected to the car at points spaced a different amount as compared to the spacing of the connections between the arm means and the frame.

23. The combination with a freight car or the like, of a frame adapted to support an automobile or the like, arm means pivotally connected to the car and to one end of the frame, arm means pivotally connected to the other end of the frame and to the car, and means for raising the frame, said arm means being connected to the car at points spaced a greater amount as compared to the spacing of the connections between the arm means and the frame.

24. The combination with a freight car or the like, of a frame adapted to support an automobile or the like, arm means pivotally connected to the car and to one end of the frame, telescopic arm means pivotally connected to the other end of the frame and the car, and means for raising the frame and simultaneously swinging it by means of the arm means.

25. The combination with a freight car or the like, of a frame adapted to support an automobile or the like, arm means pivotally connected to an upper part of the car and to one end of the frame, means for raising the frame, and abutment means on the frame adapted to engage the arm means after predetermined movement of the latter and frame so as to lock the frame and arm means for unitary swinging about the pivotal connection between the arm means and the car.

26. The combination with a freight car or the like, of a frame adapted to support an automobile, means for raising the frame, thrust means pivotally connected to the frame and adapted to be connected to lower parts of the car after the frame is raised, and means for holding the thrust means substantially in the plane of the frame when the thrust means is not in use.

27. In combination, a substantially rectangular decking frame comprising side bars spaced sufficiently to receive a portion of an automobile body between them, means on the frame between the side bars and at one end thereof for supporting one set of the automobile wheels thereon, and means between the other ends of the side bars for supporting the other set of wheels, the frame being open at its center substantially longitudinally between said supporting means at the ends of the frame.

28. In combination, a freight car, a frame for bodily supporting a vehicle, means connecting the frame to the car, and means cooperating with the first means for raising the entire frame above the floor and automatically directing it into an inclined decking position.

29. In combination, a freight car, a frame for bodily supporting a vehicle, means connecting the frame to the car, and means cooperating with the first means for raising the entire frame above the floor, shifting it longitudinally of the car, and automatically directing it into an inclined position.

30. In combination, a freight car, a frame for bodily supporting a vehicle, means connecting the frame to the car, and means cooperating with the first means for automatically and bodily moving the frame from a position adjacent the floor, and substantially spaced from the end of the car, to a position adjacent the end of the car with the frame in an inclined semi-decking position.

31. In combination, a freight car, a frame for bodily supporting a vehicle, means connecting the frame to the car, and means cooperating with the first means for automatically and bodily moving the frame from a position adjacent the floor but substantially spaced from one end of the car to a position adjacent such end of the car with the frame disposed entirely above the floor and in an inclined semi-decking position.

32. In combination, a freight car, a frame for bodily supporting a vehicle, means connecting the frame to the car, and means cooperating with the first means for automatically and bodily swinging the frame from a point substantially spaced from an end of the car and from adjacent the floor, to a point adjacent such end of the car with the frame disposed in an inclined semi-decking position.

33. In a railway box car, means for suspending motor vehicles therein for transportation comprising means swingably mounted near the end portions of the car, a pair of ramps swingably and slidably mounted on the said swingable means, and having means for receiving the wheels of a vehicle, means for raising the free ends of said ramps, said ramps when not supporting a vehicle, being movable to a position proximate to and parallel to the roof of the car and being slidable on said swingable member to cause said swingable member and said ramps to occupy approximately parallel planes near the top of the car.

34. The combination with a freight car or the like, of a supporting frame for securing objects in position, means movably connecting the frame to the car, and means cooperating with the first means for automatically moving and directing the frame into a position angled with respect to an initial position, and then into a position substantially parallel to but spaced from its initial position.

35. The combination with a freight car or the like, of a supporting frame for securing objects in position, means movably connecting the frame to the car, and means cooperating with the first means for automatically moving and directing the frame from a position substantially parallel to the floor into a position angled with respect to the floor, and then into a position where such angularity with respect to the floor is decreased.

36. The combination with a freight car or the like, of a supporting frame for securing objects in position, means movably connecting the frame to the car, and means cooperating with the first means for automatically moving and directing the frame from a position substantially parallel to the floor of the car and moving it longitudinally of the car into a vertically inclined position, and then into a position where such inclination is decreased.

37. The combination with a freight car or the like, of a supporting frame for securing objects in position and which is adapted initially to rest on the floor, means movably connecting the frame to the car and means cooperating with the first means for automatically raising the frame and moving it longitudinally into a vertically inclined position, and then into a substantially horizontal position adjacent the roof of the car.

38. An automobile decking frame including elongated side members, and longitudinally directed relatively short channel means at each corner of the frame and located at the inner sides of the side members for receiving and supporting the wheels of an automobile, the frame being open longitudinally between the channel means at opposite ends of the frame, and laterally between the side members so as to allow the upper part of an automobile body to project upwardly into the frame opening when the frame is in decking position.

39. An automobile decking frame including elongated side members and longitudinally directed relatively short members at each corner of the frame and located at the inner sides of the side members for receiving and supporting the wheels of an automobile, the frame being open longitudinally between the short members at opposite ends of the frame, and laterally between the side members so as to allow the upper part of an automobile body to project upwardly into the frame opening when the frame is in decking position.

40. An automobile decking frame including corner pan members for the support of the front and rear wheels of an automobile, transverse bars connecting the pan members at each end of the frame and longitudinal bars connecting the pan members at each side of the frame, said bars being disposed outwardly of the inner ends and inner sides of the pan members to allow the upper part of an automobile body to project upwardly into the frame opening when the latter is in decking position.

41. An automobile decking frame including corner pan members for the support of the front and rear wheels of an automobile, transverse bars connecting the pan members at each end of the frame and longitudinal bars connecting the pan members at each side of the frame, and attached thereto at the outer sides of the pan members whereby sufficient clearance is provided inwardly of the frame for the reception of the upper part of an automobile positioned beneath the frame when in decked position.

42. An automobile decking frame including corner pan members for the support of the front and rear wheels of an automobile, transverse bars connecting the pan members at each end of the frame and longitudinal bars connecting the pan members at each side of the frame, the transverse bars being disposed outwardly of the inner ends of the pan members and the longitudinal bars being connected to the outer sides of the pan members to allow the upper part of an automobile body to project upwardly into the frame when the latter is in decked position.

43. An automobile decking frame substantially rectangular in shape comprising means at the corners of the frame for receiving and supporting the wheels of an automobile, and a side member extending between the corner means at each side of the frame, said frame being open at its center to allow the top of an automobile under the frame to partially project through the opening and said side members being spaced laterally a greater amount than the corner means and sufficiently to allow the wheels of an automobile to roll between and without engaging them when the frame is on the floor of a freight car.

44. An automobile decking frame of substantially rectangular shape including longitudinal side members, a wheel supporting means at each corner of the frame at the inner sides of the side members and adapted to contact with the lower peripheral portion of the wheel of the automobile, said frame being open at its center to receive the top of an automobile to be disposed under the frame and the lateral width of the opening being greater than the lateral distance between the wheel supporting means at either end of the frame.

45. An automobile decking frame of substantially rectangular shape including longitudinal side members, means at each corner of the frame at the inner sides of the side members for supporting the lower portion of a wheel of an automobile, said frame being open at its center to receive the top of a second automobile to be disposed under the frame, the opening extending laterally at each side beyond the longitudinal line of the wheel supports at each side of the frame.

46. In combination, a substantially rectangular decking frame comprising spaced side bars, spaced laterally from each other sufficiently to allow the wheels of an automobile to roll longitudinally between them, means connecting the side bars at each end of the frame and providing a support for the wheel and axle assembly at each end of the automobile when the latter is rolled into position between the side bars, and means for holding each end of the automobile on the frame, said frame being open longitudinally between said means and laterally between the side bars through such longitudinal distance to receive a portion of a second automobile body below the frame.

47. The combination with a freight car or the like, of a frame for supporting an automobile in the car, a transversely extending hoist mounted in an upper part of the car, flexible members extending from opposite ends of the hoist, pulleys on opposite sides of the frame adjacent one end thereof, and pulleys mounted in an upper part of the car in spaced relation to the hoist, the flexible members being trained about the pulleys on the frame and then extending upwardly and over the pulleys mounted in the upper part of the car and then having their ends extending downwardly, and means anchoring the ends of the flexible members to the frame adjacent the opposite end of the latter.

48. The combination with a freight car or the like, of a longitudinally extending frame for supporting an automobile, and means for raising said frame including one continuous flexible member, hoist means operatively associated with said flexible member, means operatively connecting said flexible member to the upper part of the car, and two longitudinally spaced means on the frame connecting it to said flexible member, both being so constructed and arranged that the frame can be lifted at either point by the flexible member.

49. The combination with a freight car or the like, of a longitudinally extending frame for supporting an automobile and means for raising said frame including one continuous flexible member operatively connected with the upper part of the car at two longitudinally spaced points and operatively connected with said frame at two longitudinally spaced points, one of said four connections comprising a hoist for the flexible member, another of said connections comprising securing means for the flexible member, and the other two connections comprising guide means for the flexible member.

50. The combination with a freight car or the like, of a longitudinally extending frame for supporting an automobile and means for raising said frame including a flexible member, means for securing one end of said flexible member to said frame, guide means for said flexible member on said frame and longitudinally spaced from said last-mentioned securing means, guide means for said flexible member mounted in the upper part of the car, and hoist means for the flexible member mounted in the upper part of the car and longitudinally spaced from said last-mentioned guide means, the flexible member extending from its securing means on the frame up over the guide means in the upper part of the car, down under the guide means on the frame, and up to the hoist means.

51. In combination, a substantially rectangular automobile decking frame comprising side members spaced sufficiently to receive a portion of a lower automobile between them, means on the frame between the side members and adjacent one end thereof for supporting one set of automobile wheels thereon, and means between the side members and adjacent the other end of the frame including a cross member and means to support the other set of wheels, the frame being open at its center substantially longitudinally between said wheel supporting means adjacent the ends of the frame and said cross member being offset upwardly to provide a clear space between said side members for the reception of another portion of the lower automobile.

52. In combination, a substantially rectangular automobile decking frame comprising side members spaced sufficiently to receive a portion of a lower automobile between them and a cross member adjacent one end of the frame, means on the frame between the side members and adjacent one end thereof for supporting one set of automobile wheels thereon, and means between the other ends of the side members for supporting the other set of wheels, the frame being open at its center substantially longitudinally between said wheel supporting means adjacent the ends of the frame, and said cross member having its center portion offset upwardly so that it is above its points of connection to the side members, providing a clear space between said side members to receive another portion of the lower automobile.

SAMUEL D. BUTTERWORTH.